Apr. 10, 1923. 1,451,032
C. STECHER
SOLDERING MACHINE
Filed Oct. 2, 1919 3 sheets-sheet 1
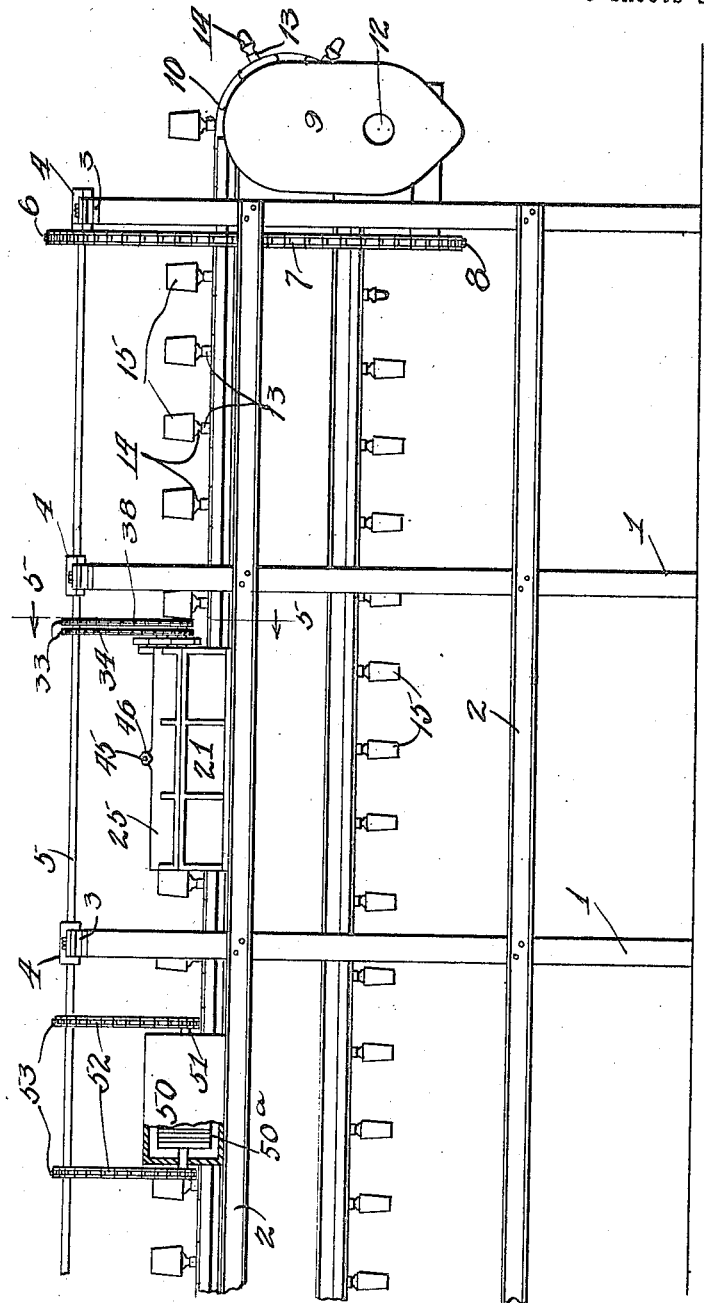

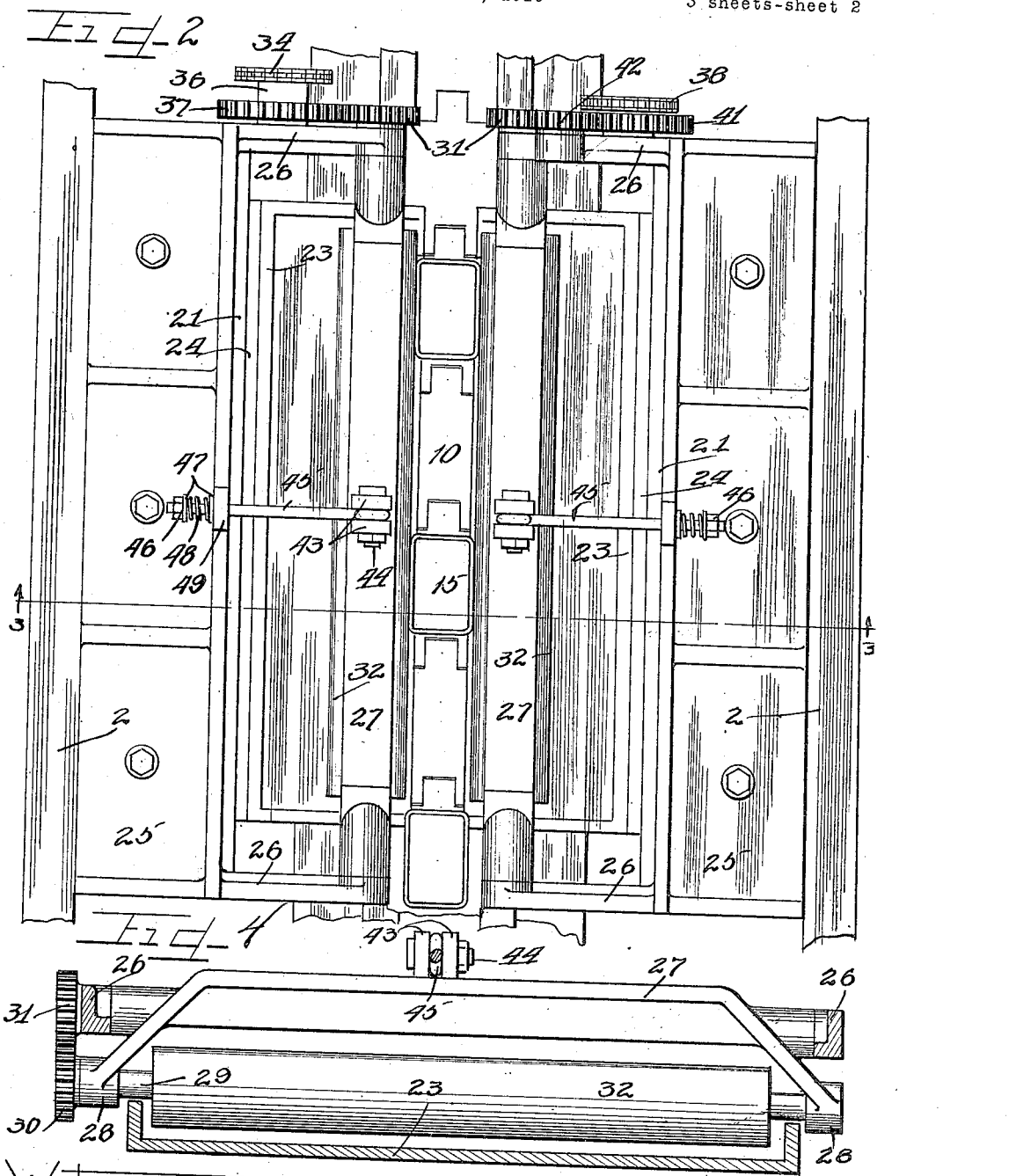

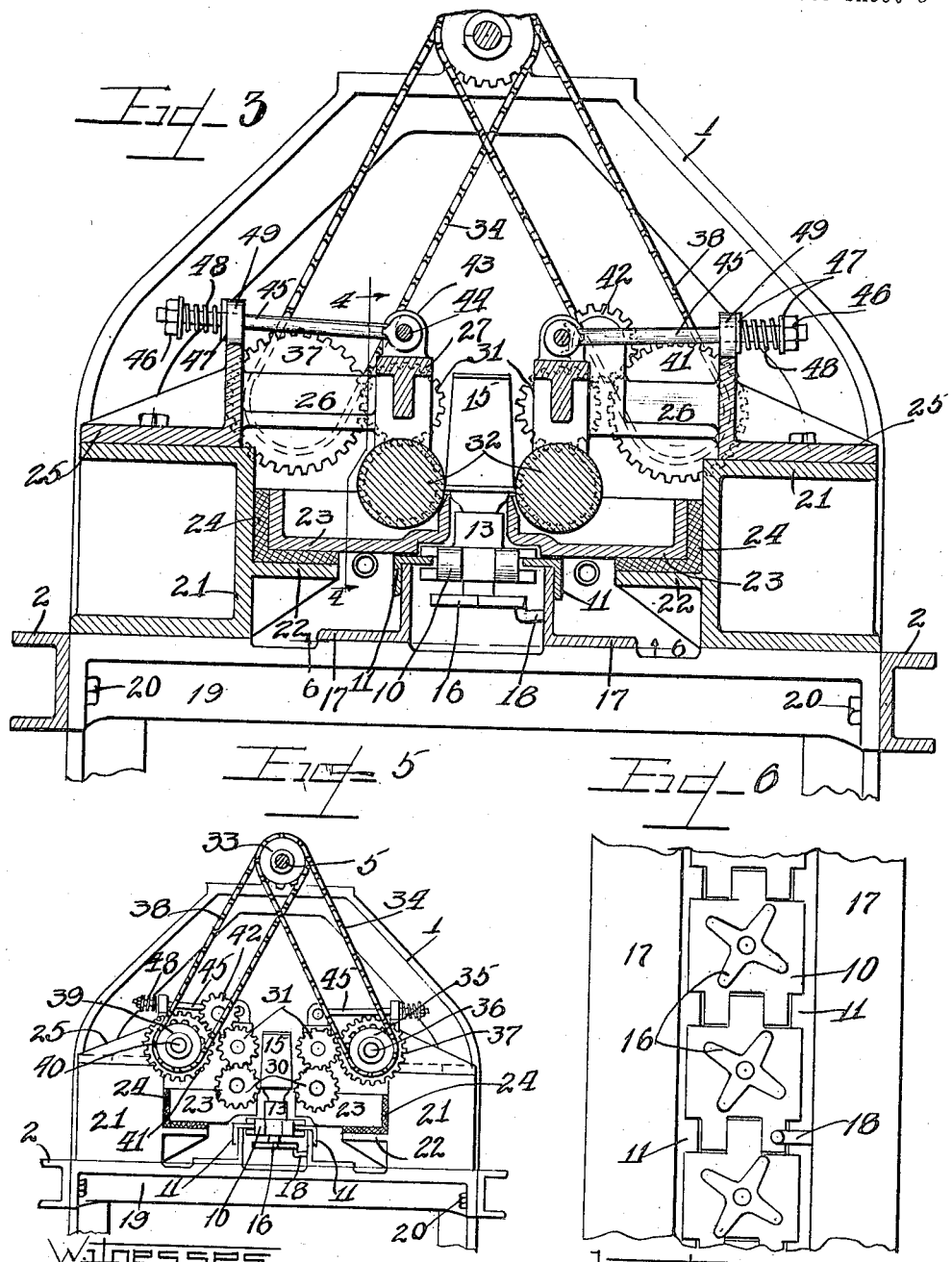

Patented Apr. 10, 1923.

1,451,032

UNITED STATES PATENT OFFICE.

CHARLES STECHER, OF CHICAGO, ILLINOIS.

SOLDERING MACHINE.

Application filed October 2, 1919. Serial No. 327,873.

*To all whom it may concern:*

Be it known that I, CHARLES STECHER, a citizen of the United States, and a resident of the city of Chicago, in the county of Cook and State of Illinois, have invented certain new and useful Improvements in a Soldering Machine; and I do hereby declare that the following is a full, clear, and exact description of the same, reference being had to the accompanying drawings, and to the numerals of reference marked thereon, which form a part of this specification.

This invention relates to a machine and a method of soldering cans and can covers together, by feeding the same through the machine between soldering rolls, which solder two sides, brush, and then rotate the cans and covers a quarter of a turn to permit soldering and brushing of the other two sides of the cans and covers.

It is an object of this invention to provide a machine for rapidly soldering covers and bottoms on rectangular cans.

It is also an object of the invention to construct a can soldering machine wherein two sides of a can cover are first soldered and brushed, after which the can is rotated to permit soldering and brushing of the other two sides of the can cover before the can is inverted to permit soldering of the bottom in position.

A further object of the invention is the construction of a machine wherein a conveyor conducts a rectangular can and covers, between parallel soldering rolls which act to solder two opposite sides of a cover in place, after which the surplus solder is brushed off, and the can and its cover is turned to permit soldering and brushing of the remaining sides of the cover as the conveyor continues to carry the can and its cover through the machine.

Another object of the invention is the method of soldering covers on cans by first soldering two sides of the cover in place, brushing off the surplus solder, and then rotating the can and cover to permit soldering and brushing of the other two sides of the can cover.

It is furthermore an object of the invention to provide a method of securing covers on cans by first soldering two opposite sides of a cover in place and then rotating the cover and can to permit soldering of the remaining sides of the cover.

It is an important object of this invention to provide a machine adapted to convey cans and end covers therethrough, to alternately apply solder to the covers and then brush away the surplus solder.

Other and further important objects of this invention will be apparent from the disclosures in the specification and drawings.

The invention (in a preferred form) is illustrated in the drawings and hereinafter more fully described.

On the drawings:

Figure 1 is a side elevation of a soldering machine embodying the principles of this invention, and showing one end of the machine broken away.

Figure 2 is an enlarged top plan view of the soldering machine, with parts omitted.

Figure 3 is a sectional view taken on line 3—3 of Figure 2.

Figure 4 is an enlarged sectional view taken on line 4—4, of Figure 3.

Figure 5 is an enlarged view taken on line 5—5 of Figure 1.

Figure 6 is a fragmentary detail view taken on line 6—6, of Figure 3.

As shown on the drawings:

The frame work of the machine embraces a plurality of parallel upright arched metal standards 1, rigidly connected together in spaced relation by means of a plurality of channel rails 2, which are rigidly secured longitudinally of the machine to the vertical side members of the standards 1. Each standard 1, has a boss 3, integrally formed centrally upon the arched portion thereof, affording a mounting for a journal box or bearing 4. A long driving shaft 5, is disposed longitudinally of the machine, and rotatably seats in the alined journal boxes 4. A large sprocket gear 6, is keyed or otherwise secured near one end of the shaft 5, to the inside of the first standard 1. Trained around the sprocket gear 6, is a continuous driving chain 7, which is also trained around a sprocket gear 8, connected to be driven by driving gears disposed within a casing 9, mounted at one end of the machine. The driving gears within the casing 9, are also adapted to rotate a continuous conveyor 10, which is mounted to run longitudinally through the middle portion of the machine. Parallel angle guide rails 11, are mounted longitudinally of the machine with the horizontal flanges directed inwardly toward each other to afford guides for the conveyor 10, as shown in Figure 3, The driving gears within the casing 9, are adapted to be driven from a driving or power shaft 12, connected with any suitable source of power.

Rotatably mounted upon the conveyor 10, are a plurality of equidistantly spaced can holders 13, provided with heads 14. The holders 13, are disposed to project outwardly at right angles to the conveyor, and are adapted to receive rectangular shaped cans 15, thereon to convey the same through the machine for the purpose of soldering tops and bottoms to said cans. Each can embraces a rectangular body portion, adapted to be closed at one end by a bottom plate, and at the other end by a top plate provided with a filler opening through which the head 14, of a can holder is adapted to engage so that a can can be conveniently conveyed through the machine. The lower ends of the rotatable can holders 13, project through the conveyor, and each can holder has secured on the inner end thereof a four armed star wheel 16. Angle members 17, support the conveyor guide members 11, and secured on the inner surface of the vertical flange of one of said angle members 17, is a hooked member or finger 18, adapted to co-act with the star wheels 16, for rotating the can holders a quarter of a turn, after the cans have been soldered and the surplus solder has been removed as hereinafter described.

Rigidly secured transversely of the machine to the channel rails 2, and between two of the standards 1, are a plurality of cross-beams 19, held in place by bolts 20. The cross-beams serve as supports for the soldering mechanism which comprises two parallel base members 21, disposed on opposite sides of the guide angles 11. A shelf 22, is formed on the inner surface of the vertical wall of each of the base members 21. A solder-containing box or tank 23, is positioned on each side of the conveyor, and is seated on heat insulating material 24, which rests upon the shelves 22, and the angle guide members 11, as clearly shown in Figure 3. The adjacent walls of the soldering tanks 23, are spaced apart to afford a channel or passage through which the can holders 13, are permitted to pass between two parallel soldering rollers 32, which are rotatably disposed in the soldering tanks, adjacent the inner longitudinal walls of said tanks. Mounted upon each base member 21, is an angle member 25, having integrally formed on the vertical flange thereof two inwardly directed arms 26, which afford supports for an adjustable arched truss or bridge beam 27, disposed above the soldering rollers. Bearing sleeves 28, are integrally formed on the ends of the bridge beam 27, and rotatably support the ends of the roller axle 29. Secured on one projecting end of the roller axle 29, is a gear 30, which meshes with a gear 31, supported on one end of the bridge beam.

Keyed on the main shaft 5, are two spaced sprocket gears 33. An endless chain 34, is trained around one of said sprocket gears 33, and around a sprocket gear 35, mounted on a stub shaft 36, supported on one of the arms 26. A large gear 37 is also secured on the stud shaft 36, and meshes with one of the gears 31. Trained around the other sprocket gear 33, is an endless chain 38, which is trained around a sprocket gear 39, secured on a stub shaft 40, supported on another of the arms 26. A large gear 41, is also mounted on the stub shaft 40, and meshes with a rotatable reversing gear 42. The gear 42, is also in mesh with the gear 31 on that side of the machine.

Integrally formed centrally on the top of each bridge beam 27, are two spaced vertical lugs 43, which support a bolt 44. Pivotally mounted on the bolt 44, between the lugs 43, in the inner end of a rod or bolt 45, the outer end of which has a nut 46, adjustably threaded thereon. Slidable on the pivoted rod 45 are washers or rings 47 between which a coiled spring 48 is disposed coiled around the rod 45. The rod 45 is adapted to slidably project through an apertured lug 49, integrally formed on the top of the vertical flange of the respective angle member 25.

As shown in Figure 1, a brushing or scraping device is supported on the channel rails 2 of the machine framework, and each brush device comprises two casings 50, each having a shaft 51, journalled longitudinally therein and projecting therefrom. A solder scraper or brush 50ª is mounted on each of the shafts 51, within the casings 50, which are open on the inner sides to permit the brushes to brush off any surplus solder from the cans as they are conveyed through the machine, after leaving the soldering mechanism. A sprocket gear is secured on one projecting end of each of the shafts 51, and trained around said sprocket gears are chains 52, which are also trained around sprocket gears 53 keyed on the main shaft 5.

The operation is as follows:

The driving mechanism for the machine is disposed in the casing 9, mounted at the feeding end of the machine framework. The conveyor 10, is rotated when the machine is started, and cans 15, to be soldered are adapted to be fed to the conveyor by any suitable means. The cans are of rectangular shape and the tops are provided with central filler openings in which the heads 14, of the can holders 13, engage. The can tops are peripherally flanged to receive one end of the rectangular can bodies. The conveyor acts to carry the can parts inwardly into the soldering mechanism between the rotating soldering rollers 32, which are actuated by the driving chains 34 and 38. The tanks 23, have molten solder therein, into which the rollers dip as they rotate. Solder is thus carried by the rotating rollers, and deposited from above into the cracks between two sides of the can body and two opposite flanges of a can top. With two opposite sides soldered the can parts continue on their way and pass through the brushing devices 50, the brushes 50ª of which act to remove any surplus solder.

After leaving the brushing device the star wheel 16, of each can holder 13, is caused to automatically rotate one quarter of a revolution, by contacting the finger 18. This causes the can holder to rotate to position the other two sides of the can parallel to the rollers 32. The conveyor continues to carry the can and its top through the machine through a second soldering mechanism and then through a second brushing device, whereby the remaining two flanges of the can top are soldered to the walls of the can.

The cans with the tops soldered thereon as described are next carried around the bight of the conveyor and have flanged bottoms engaged thereon. The can bottoms are soldered to the can wall in a manner similar to that described for the soldering of the can tops. All surplus solder is removed by the brushing devices 50. The cans having the tops and bottoms soldered thereto as described are removed from the conveyor can holders after the cans pass through the last brushing device.

The rods 45, are adapted to permit the soldering rollers 32, to be moved toward or away from one another to permit different sized cans to be conveyed through the machine and soldered.

I am aware that various details of construction may be varied through a wide range without departing from the principles of this invention and I therefore do not purpose limiting the patent granted otherwise than necessitated by the prior art.

I claim as my invention:

In a can soldering machine, a soldering mechanism comprising a solder tank, a support therefor, a bracket pivotally supported on said support above said tank, a soldering roller journalled in said bracket, means for rotating the roller, a rod pivotally connected to said bracket and slidable through said support, and a spring engaged around said rod for swinging said bracket to resiliently hold the roller in a soldering position against a can to be soldered.

In testimony whereof I have hereunto subscribed my name in the presence of a subscribing witness.

CHARLES STECHER.

Witness:
  EARL M. HARDINE.